(12) United States Patent
Peterson et al.

(10) Patent No.: US 8,577,376 B2
(45) Date of Patent: Nov. 5, 2013

(54) LOCATION BASED NETWORK ACCESS POINT SCANNING

(75) Inventors: Nathan J. Peterson, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/299,057

(22) Filed: Nov. 17, 2011

(65) Prior Publication Data

US 2013/0130680 A1  May 23, 2013

(51) Int. Cl.
*H04W 36/00* (2009.01)

(52) U.S. Cl.
USPC ........... 455/441; 455/437; 455/440; 455/442; 455/456.1; 370/331; 370/333

(58) Field of Classification Search
USPC ................ 455/432.1–453, 456.1–456.3, 457; 370/331–334
See application file for complete search history.

(56) References Cited

U.S. PATENT DOCUMENTS

| | | | |
|---|---|---|---|
| 6,351,642 B1 * | 2/2002 | Corbett et al. | 455/442 |
| 2011/0176494 A1 * | 7/2011 | Huang et al. | 370/329 |
| 2012/0322465 A1 * | 12/2012 | Huang et al. | 455/456.6 |
| 2013/0150070 A1 * | 6/2013 | Beser | 455/452.2 |

* cited by examiner

*Primary Examiner* — Dai A Phuong
(74) *Attorney, Agent, or Firm* — Schwegman Lundberg & Woessner, P.A.

(57) ABSTRACT

A system and method include determining location information identifying a location of a portable information handling device, sorting a list of network profiles based on the location information, and scanning the list of sorted network profiles to identify an access point for connecting the portable information handling device to a network.

17 Claims, 3 Drawing Sheets

LOCATION BASED NETWORK ACCESS POINT SCANNING

BACKGROUND

Laptop computers and other portable systems may be moved to different locations, which may result in a different network that is available to provide wireless services. When connecting to a wireless network, a computer system scans through all of the network profiles configured on the computer system and match them with detected network access points. While some systems may allow a user to prioritize the order in which the scanning occurs, the scanning still proceeds through the list. When the system is moved to a distant new location, the prioritized list may not have the available networks in the new location near the beginning of the list, resulting in a long scan of the list.

SUMMARY

A method include determining location information identifying a location of portable information handling devices, sorting a list of network profiles based on the location information, and scanning the list of sorted network profiles to identify an access point for connecting the portable information handling device to a network.

The method may also be stored as computer instructions on a computer readable storage device from which an information handling device may execute the instructions as a specifically programmed machine.

In a further embodiment, a system includes a processor, a computer readable storage device having a list of network profiles identifying access points and locations for each access point, and a location identifier that identifies a location of the information handling device. The processor is operable to search the list of network profiles as a function of the location identifier.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on an information handling system, including a computer system, such as a personal computer, server or other computer system.

A list of network profiles has geographical location information associated with each network access point. When an information handling device or system such as a laptop or other portable computer attempts to establish a network connection to one or more detected access points, the list of network profiles is searched by location. For example if the laptop is currently located in California, network profiles located in California would first be scanned for a match with a detected access point for connection. Network profiles located outside California, such as those located in North Carolina would not be scanned for when connecting.

Figure 1:
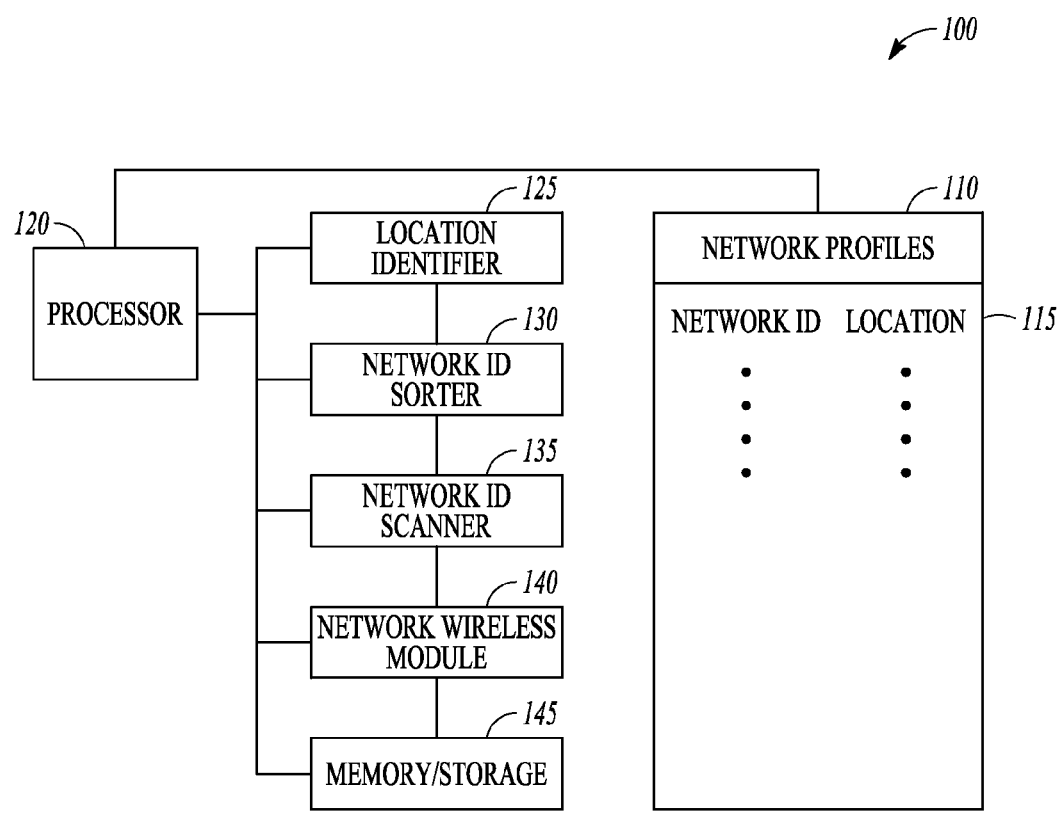
FIG. 1 is a block diagram of a portable information handling device having a location sorted list of network access points according to an example embodiment.

FIG. 1 is a block diagram of an information handling system 100 such as a laptop computer. A list of network profiles 110 contains access point information 115 to which the system 100 may connect if within range. The access point information 115 includes network identification information suitable to allow the system 100 to connect. Saved user ids and passwords may be included in the information 115 in some embodiments. In addition, each network profile includes geographical location information associated with an access point, such as latitude and longitude in some embodiments. In further embodiments, physical addresses may be used.

A processor 120 is coupled to the network profiles and may be used to access the profiles by any of the fields, such as network ID or location. In some embodiments, the list of network profiles may be stored in the form of a relational database with an option location index useful in finding access points proximate the current system location faster.

A location identifier 125, such as a global positioning system (GPS) module or an IP address provides location information to the processor 120. In some embodiments, the location may be manually entered. In some embodiments, geographical location information may also be obtained based on a network IP address obtained when connecting to a network. This location may be referred to as an updateable base location. When connecting to an access point for the first time, a reverse lookup on the IP assigned to the system may be done in order to get an initial location measurement. The reverse lookup may be used if GPS is not available inside the building when a connecting. Any location measurement can be updated if a more fine grained resolution is found for that network later. But after that GPS reading can be used to help with the search order if the system is outside near that building.

Location identifier 125 provides a machine readable location identifier to processor 120. Once the location is obtained, a network ID sorter 130 may be used to sort or index into the network profiles list 110 by the location identifier. The sorter 130 may include machine readable code to cause the processor 120 to sort or index into the network profile list 110. Note that a network ID may work in many different locations, including different countries. The sorting of the list may take this into account by including such a network ID near the top of the list when any of the corresponding locations are identified as a likely or detected current location.

At 135, a network ID scanner may include machine readable code to cause the processor to scan the sorted or indexed list of profiles for access point locations that are closest to the current location, and provide a connection to a detected access point corresponding to an access point from the list via a network wireless module 140. A further memory/storage device 145 may be used to store other executable code for execution on processor 120.

Figure 2:
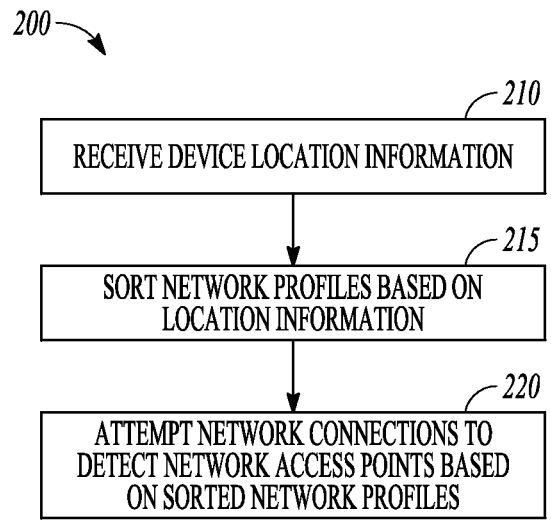
FIG. 2 is a flowchart illustrating a method of prioritizing network access points based on location of a portable information handling device according to an example embodiment.

A method 200 of prioritizing network access points based on location of a portable system or device is shown in flowchart form in FIG. 2. Method 200 includes receiving device location information at 210. At 215, a list of network profiles is sorted or indexed based on the location information. At 220, the system attempts network connections to detected network access points based on the sorted network profiles, or utilizing a location index. In some embodiments, the network profile list is sorted as soon as the location of the system is identified. In further embodiments, a search order of the list is prioritized by location when the system begins an attempt to find an access point.

Figure 3:
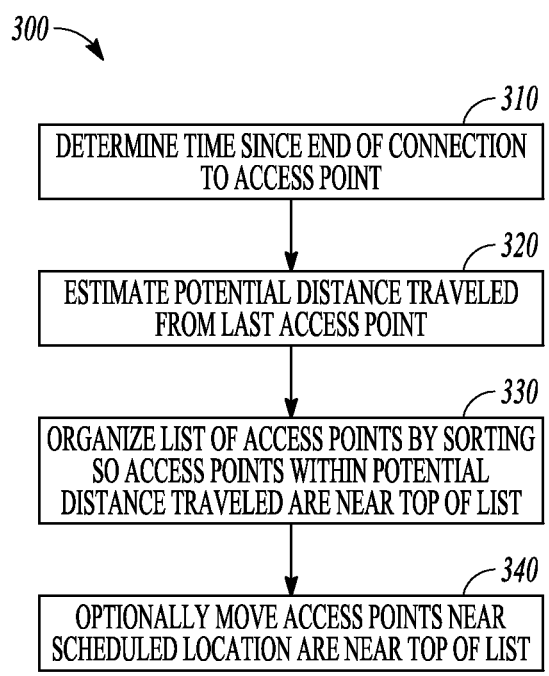
FIG. 3 is a flowchart illustrating an alternative method of prioritizing network access points according to an example embodiment.

In one example, if the system is currently located in California, network profiles for access points located in North Carolina would not be scanned for when connecting. In further embodiments, the search algorithm factors in length of time since last network connection and a reasonable distance from the last connection as illustrated in flowchart form at 300 in FIG. 3. For example if the system was last connected to a network five minutes ago, the scan might restrict its search to anything within five miles from the last connection location. In one embodiment, the system assumes a potential travel speed of 60 miles per hour, and simply multiplies the time since last connection by 60 miles per hour and places all access points within that distance near the top of the list for scanning, effectively creating a geographical boundary of likely location for sorting the list. In further embodiments, the location information has sufficient granularity to distinguish many work and home location differences and prioritize the list accordingly, even when work and home locations may be within a short commute of each other.

At 310, the system determines an amount of time since connection to the last access point. At 320, an estimated potential distance traveled is calculated as a function of the amount of time. The system then organizes the list according to the estimated potential distance at 330. In further embodiments as illustrated at 340, the system may utilize a user calendar which indicates where the user is planning on being at the time the system looks for an access point. The calendar location may then be used to sort the network profile list prior to scanning for a profile corresponding to detected access points.

Figure 4:
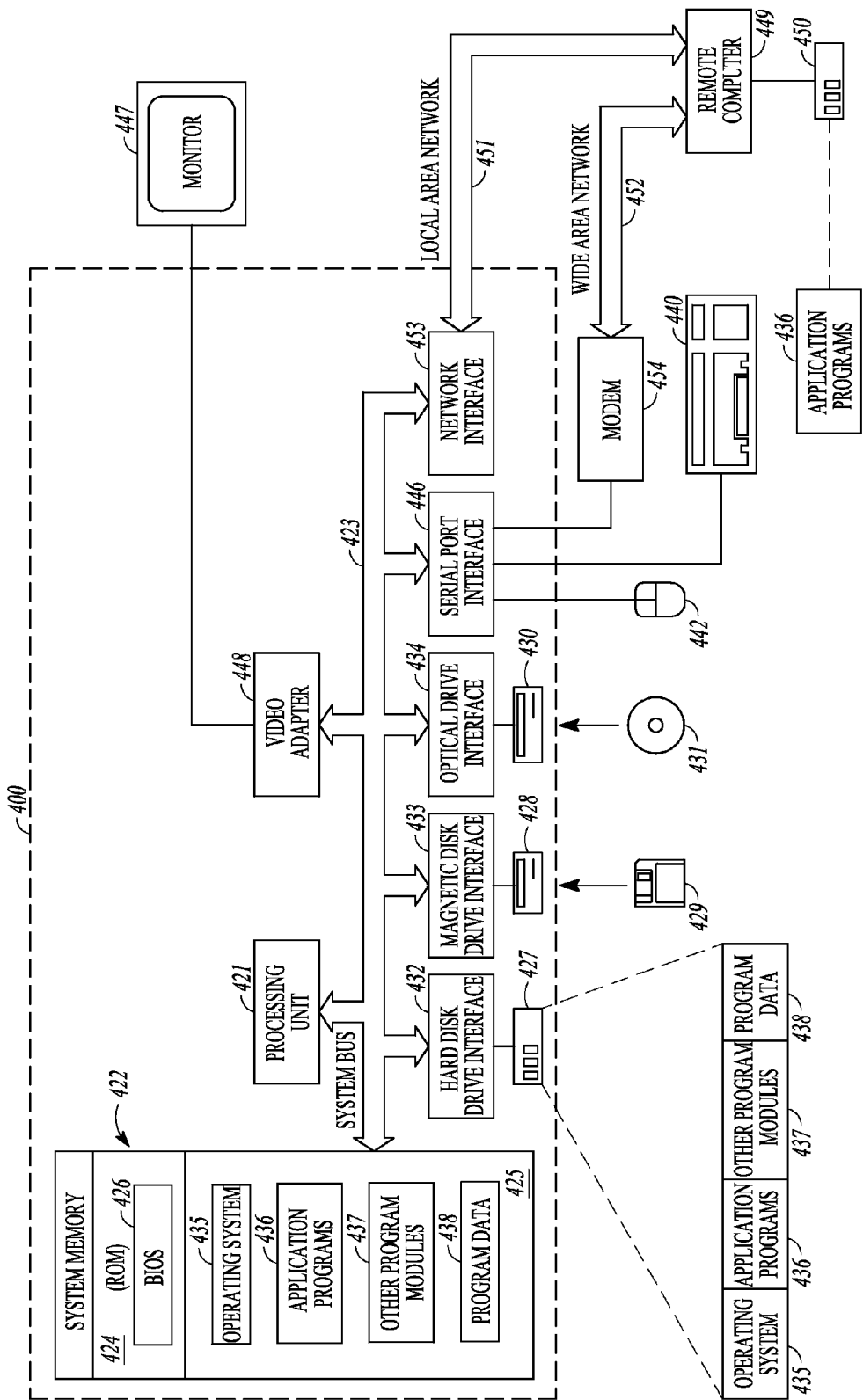
FIG. 4 is a block diagram of an information handling device to implement methods according to an example embodiment.

FIG. 4 is a block diagram of an information handling device or system to implement methods according to an example embodiment. In the embodiment shown in FIG. 4, a hardware and operating environment is provided that is applicable to any of the methods and algorithms described herein.

As shown in FIG. 4, one embodiment of the hardware and operating environment includes a general purpose information handling device in the form of a computer 400 (e.g., a personal computer, workstation, or server), including one or more processing units 421, a system memory 422, and a system bus 423 that operatively couples various system components including the system memory 422 to the processing unit 421. There may be only one or there may be more than one processing unit 421, such that the processor of computer 400 comprises a single central-processing unit (CPU), or a plurality of processing units, commonly referred to as a multiprocessor or parallel-processor environment. In various embodiments, computer 400 is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 426, containing the basic routines that help to transfer information between elements within the computer 400, such as during start-up, may be stored in ROM 424. The computer 400 further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 couple with a hard disk drive interface 432, a magnetic disk drive interface 433, and an optical disk drive interface 434, respectively. The drives and their associated computer-readable media provide non volatile storage of computer-readable instructions, data structures, program modules and other data for the computer 400. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein may be resident on any one or number of these computer-readable media.

A user may enter commands and information into computer 400 through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can also be connected to the system bus 423 via an interface, such as a video adapter 448. The monitor 447 can display a graphical user interface for the user. In addition to the monitor 447, computers typically include other peripheral output devices (not shown), such as speakers and printers.

The computer 400 may operate in a networked environment using logical connections to one or more remote computers or servers, such as remote computer 449. These logical connections are achieved by a communication device coupled to or a part of the computer 400; the invention is not limited to a particular type of communications device. The remote computer 449 can be another computer, a server, a router, a network PC, a client, a peer device or other common network node, and typically includes many or all of the elements described above I/0 relative to the computer 400, although only a memory storage device 450 has been illustrated. The logical connections depicted in FIG. 4 include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer 400 is connected to the LAN 451 through a network interface or adapter 453, which is one type of communications device. In some embodiments, when used in a WAN-networking environment, the computer 400 typically includes a modem 454 (another type of communications device) or any other type of communications device, e.g., a wireless transceiver, for establishing communications over the wide-area network 452, such as the internet. The modem 454, which may be internal or external, is connected to the system bus 423 via the serial port interface 446. In a networked environment, program modules depicted relative to the computer 400 can be stored in the remote memory storage device 450 of remote computer, or server 449. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A method comprising:
    determining location information identifying a location of portable information handling device;
    sorting a list of network profiles based on the location information; and
    scanning the list of sorted network profiles to identify an access point for connecting the portable information handling device to a network;
    wherein determining location information comprises:
        determining an amount of time since connection to the access point;
        calculating an estimated potential distance the portable information handling device traveled as a function of the amount of time multiplied by a velocity; and
    and wherein the list of network profiles is organized according to the estimated potential distance traveled.

2. The method of claim 1 wherein the list of network profiles includes geographical location information.

3. The method of claim 2 wherein the geographical information includes latitude and longitude of each access point.

4. The method of claim 3 wherein the location information identifying the location of the portable information handling device is provided by a global positioning system.

5. The method of claim 4 wherein the global positioning system is integrated with the portable information handling device.

6. The method of claim 1 wherein the estimated potential distance traveled is a function of the amount of time multiplied by a predetermined velocity.

7. A computer readable storage device having instructions for execution by an information handling system to perform a method, the method comprising:
    determining location information identifying a location of portable computer system;
    sorting a list of network profiles based on the location information; and
    scanning the list of sorted network profiles to identify an access point for connecting the portable computer system to a network;
    wherein determining location information comprises:
        determining an amount of time since connection to the access point;
        calculating an estimated potential distance the portable computer system traveled as a function of the amount of time multiplied by a velocity; and
        organizing the list of network profiles according to the estimated potential distance traveled.

8. The computer readable medium of claim 7 wherein the list of network profiles includes geographical location information.

9. The computer readable medium of claim 8 wherein the geographical information includes latitude and longitude of each access point.

10. The computer readable medium of claim 9 wherein the location information identifying the location of the portable computer system is provided by a global positioning system.

11. The computer readable medium of claim 10 wherein the global positioning system is integrated with the portable computer system.

12. The computer readable medium of claim 7 wherein the estimated potential distance traveled is a function of the amount of time multiplied by a predetermined velocity.

13. A system comprising:
    a processor;
    a computer readable storage device having a list of network profiles identifying access points and locations for each access point;
    wherein the processor is programmed to determine location information of the system by, at least in part:
        determining an amount of time since connection to the access point;
        calculating an estimated potential distance traveled as a function of the amount of time multiplied by a predetermined velocity; and
        organizing the list of network profiles according to the estimated potential distance
    wherein the processor is programmed to search the list of network profiles as a function of the location information.

14. The system of claim 13 wherein the list of network profiles includes geographical location information.

15. The system of claim 14 wherein the geographical information includes latitude and longitude of each access point.

16. The system of claim 15 wherein the location information identifying the location of the portable computer system is provided by a global positioning system.

17. The system of claim 16 wherein the global positioning system is integrated with the portable computer system.

* * * * *